United States Patent Office 2,930,252
Patented Mar. 29, 1960

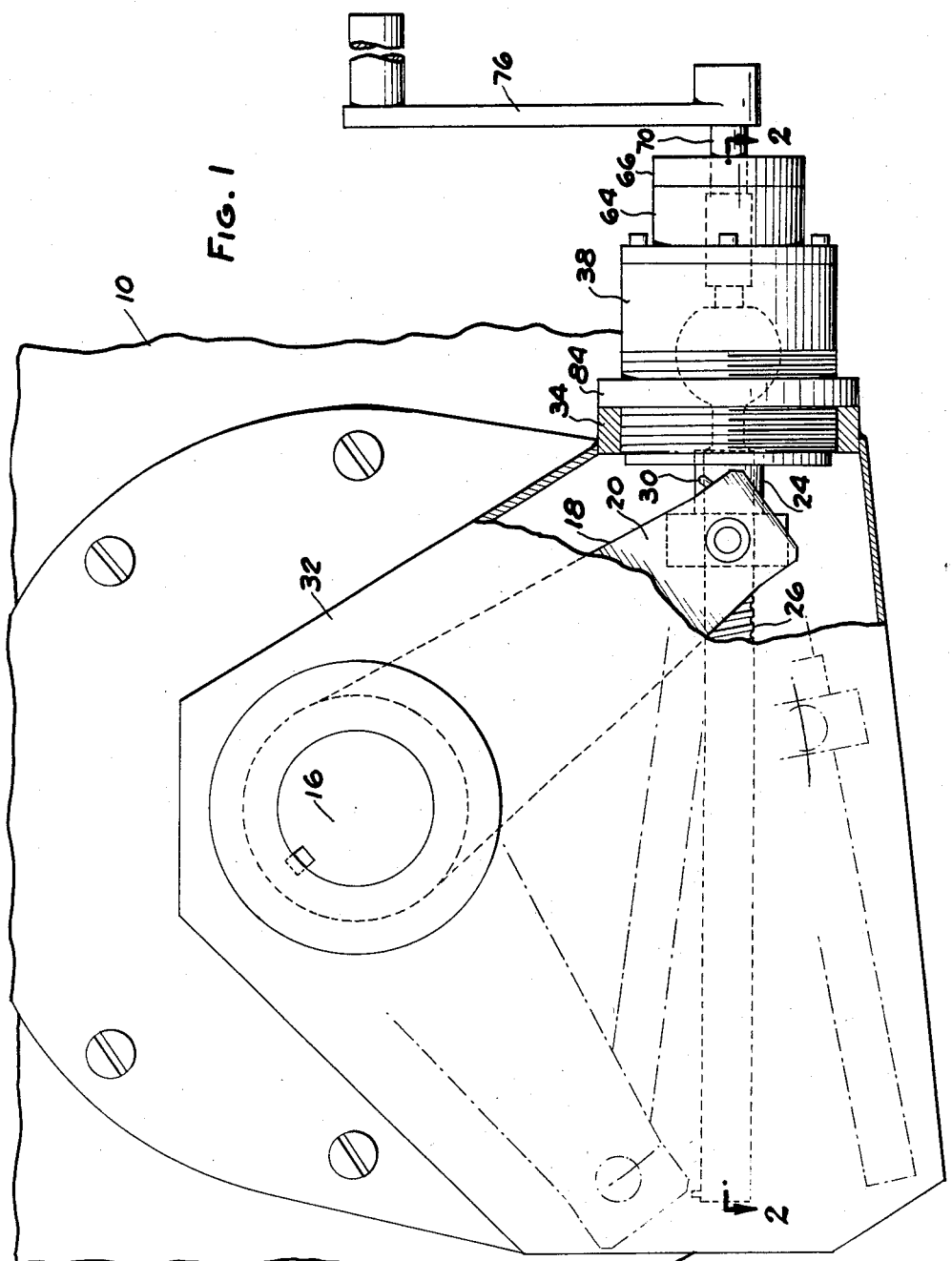
March 29, 1960  R. E. SEARS ET AL  2,930,252
VALVE OPERATOR
Filed March 23, 1959  2 Sheets-Sheet 1
INVENTORS
RICHARD E. SEARS & WALTER H. MORRIS
BY
*Barnes, Kisselle, Raisch & Choate*
ATTORNEYS March 29, 1960
R. E. SEARS ET AL
2,930,252
VALVE OPERATOR
Filed March 23, 1959
2 Sheets-Sheet 2
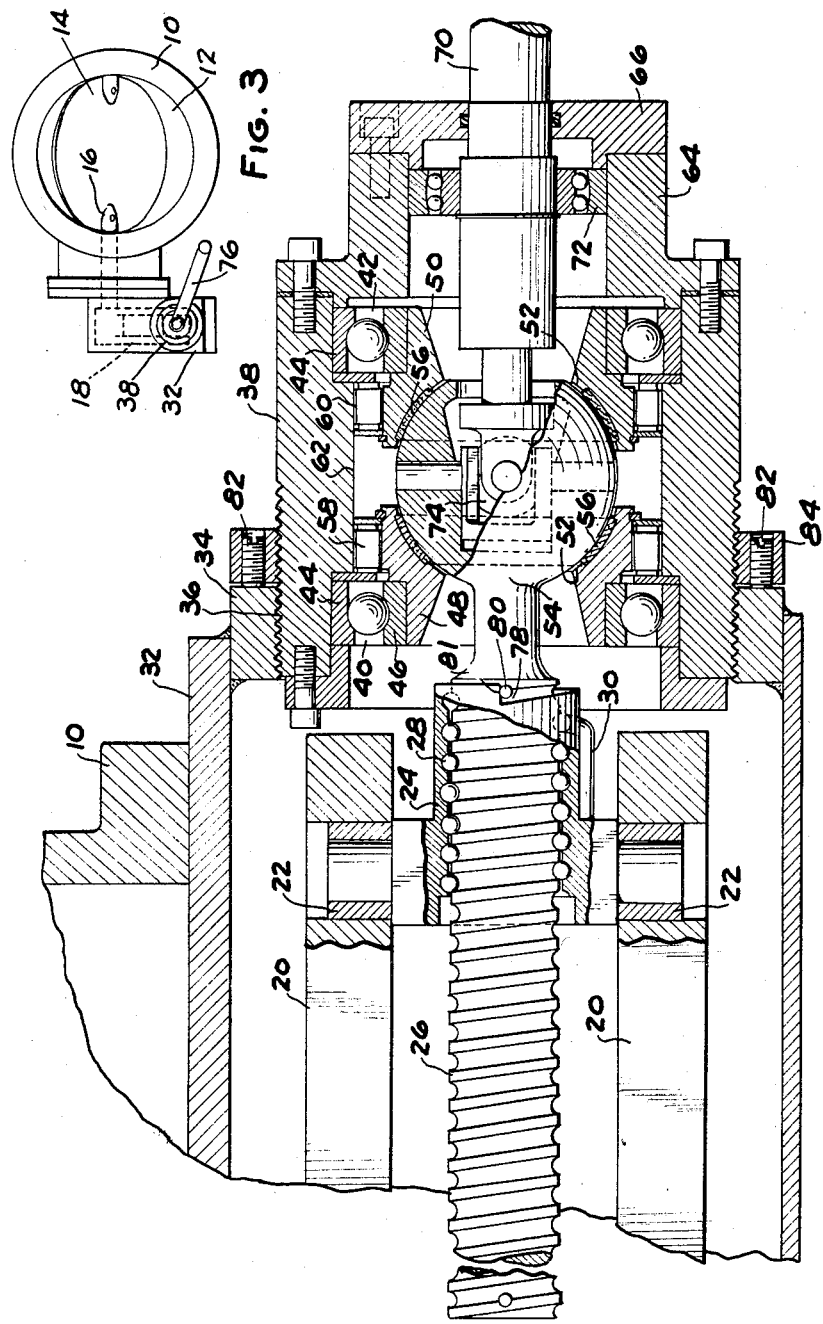
INVENTORS
RICHARD E. SEARS & WALTER H. MORRIS
BY
Barnes, Kisselle, Raisch & Choate
ATTORNEYS

2,930,252

VALVE OPERATOR

Richard E. Sears, Birmingham, and Walter H. Morris, Rochester, Mich., assignors to Beaver Precision Products, Inc., Clawson, Mich., a corporation of Michigan Application March 23, 1959, Serial No. 801,017

14 Claims. (Cl. 74—509)

This invention relates to a valve operator.

In large butterfly valves and many other mechanisms, a bellcrank is utilized as the actuating member and means are provided for swinging the bellcrank in opposite directions. A ball screw and nut arrangement is ideally suited for operating the bellcrank because of the high efficiency of such an arrangement. However, the problem that arises in connection with the use of ball screws and nuts for such application is that if the valve member or other mechanism operated by the bellcrank is subjected to a biasing force which tends to cause the bellcrank to swing from a desired position of adjustment, some form of locking means for retaining the bellcrank in its adjusted position are required.

The present invention has for its object the provision of a ball screw and nut arrangement for operating a bellcrank actuated mechanism such as a butterfly valve or the like which incorporates a "no-back" arrangement for frictionally restraining rotation of the ball screw other than when the ball screw is positively driven.

The present invention is further characterized in that the "no-back" arrangement is incorporated in a ball joint which enables the ball screw to pivot so as to accommodate for the swinging movement of the ball nut at the end of the bellcrank.

In the drawings:

Fig. 1 is a fragmentary side elevational view, partly in section, of a valve and valve operator constructed in accordance with the present invention.

Fig. 2 is a sectional view along the lines 2—2 in Fig. 1.

Fig. 3 is an end view of the valve and operator assembly shown in Fig. 1 with the valve member in a partially opened condition.

Referring to Figs. 1 and 3, there is illustrated at 10 a valve housing which includes a passageway 12 controlled by a butterfly valve member 14. Valve member 14 is pivotally supported in valve housing 10 by means of a shaft 16, to the outer end of which is fixed a bellcrank in the form of a yoge 18 having parallel arms 20. Between the free ends of arms 20, there is pivotally supported, by means of bearing bushings 22, a ball nut member 24. A ball screw 26 extends through nut 24 and is interengaged therewith by a plurality of balls 28 (Fig. 2).

The construction of ball nut 24 and ball screw 26 is conventional and need not be described in detail. It is suffice to say that as the ball screw 26 is rotated, nut 24 is advanced axially along the screw and the balls 28 are caused to travel in an endless path through the grooved portions of the nut and screw and a ball return passageway 30, which extends between the opposite ends of the ball groove in the nut.

A weldment 32 is mounted on the side of valve housing 10 and encloses bellcrank 18 and screw 26. At one end of weldment 32, there is arranged a threaded bushing 34 into which is threaded as at 36 a sleeve 38. Within the opposite ends of sleeve 38, a pair of opposed thrust bearings 40 and 42 are seated. The outer races 44 of these bearings are fixedly mounted in sleeve 38 as illustrated in Fig. 2. The inner races 46 support annular socket members 48, 50. The socket members 48, 50 are each formed with a spherically shaped seating surface 52 which generally conforms with the spherical surface of a ball member 54 formed on the end of screw 26 which projects into sleeve 38. A layer of friction material 56 is interposed between the seating surfaces 52 of each of the socket members 48, 50 and the outer surface of ball member 54.

While a variety of different friction materials may be employed for the friction pads 56, it is preferred to use "Teflon," a polymerized tetrafluoroethylene. "Teflon" has very desirable friction characteristics. It has a relatively low coefficient of friction and will stand very high loads at slow rubbing speeds. In addition, it has a low ratio of static to kinetic friction. Any friction material generally possessing these properties may be used for the friction pads 56.

Sprag clutches 58, 60 are arranged between the socket members 48, 50, respectively, and the inner cylindrical surface 62 of sleeve 38 (Fig. 2). In the arrangement shown, sprag clutch 58 locks the socket member 48 against rotation in a counterclockwise direction and sprag clutch 60 locks socket member 50 against rotation in a clockwise direction.

The outer end of sleeve 38 is closed by an extension 64 and a cap 66 through which a drive shaft 70 extends. Drive shaft 70 is journalled in a self-aligning bearing 72 and is connected with ball member 54 by means of a universal joint 74 the center of which coincides with the center of ball member 54. The outer end of drive shaft 70 is adapted to be driven in any suitable manner. In the arrangement illustrated in the drawings, shaft 70 has a crank 76 mounted thereon.

Referring to Fig. 2, it will be noted that one end of nut 24 is notched as at 78 to engage with a stop pin 80 on screw 26. Pin 80 engages in a torsion direction the axially extending shoulder 81 formed by notch 78 on nut 24 to limit the movement of nut 24 on screw 26 in a direction toward the right. In this position of nut 24, it is desirable to have the valve member 14 fully closing the passageway 12. To effect a complete closing of passageway 12 when the nut 24 is in the position illustrated in Fig. 2, sleeve 38 is adjusted axially by threading it into or out of bushing 34. Screw 26 is moved with sleeve 38 as a unit so that the arms 20 of bellcrank 18 are swung to the position corresponding to the fully closed position of valve 14. When this adjustment of sleeve 38 is effected, the sleeve may be locked in its adjusted position by tightening the set screws 82 in the threaded locking ring 84.

In operation, assuming that valve member 14 fully closes passageway 12 when the nut 24 is in the position illustrated in Fig. 2 in order to open the valve, crank 76 is rotated in a counterclockwise direction. The reaction of bellcrank 18 through nut 24 produces an axial thrust on screw 26 which initially is in a direction towards the right when the drive shaft 70 is rotated in a counterclockwise direction. This relieves the frictional engagement between the ball 54 and the friction pad 56 on the socket member 48 so that even though socket member 48 is prevented by sprag clutch 58 from rotating in a counterclockwise direction, the friction pad 56 does not offer any substantial friction to the counterclockwise rotation of screw 26.

If valve member 14 is in a position partially or fully opening passageway 12, then nut 24 is located on screw 26 in a position to the left of the position shown in Fig. 2. If it is desired to close the valve, then shaft 70 is rotated in a clockwise direction. This produces an axial thrust on screw 26 in a direction towards the left which increases the frictional engagement between the ball member 54 and the socket member 48 and relieves the frictional resistance between the ball member 54 and the friction pad 56 on the socket member 50. Thus, the high efficiency of the ball screw and nut arrangement is retained when the shaft 70 is rotated to either open or close the valve.

When valve 14 is in a position other than fully closed or fully opened, the pressure of the fluid flowing through passageway 12 may have a tendency to pivot valve member 14 and consequently the bellcrank 18 to either the fully opened or fully closed position. This tendency for the bellcrank 18 to swing from any position of adjustment is restrained by the "no-back" arrangement illustrated. If bellcrank 18 has a tendency to swing toward the right, that is, a counterclockwise direction as viewed in Fig. 1, the thrust on screw 26 is toward the right. This produces a firm frictional engagement between ball member 54 and the friction pad 56 on the socket member 50. Since movement of nut 24 on screw 26 in a direction toward the right would normally tend to rotate screw 26 in a clockwise direction, bellcrank 18 is retained in its adjusted position because sprag clutch 60 is locked against rotation in this direction and the ball member 54 is in firm frictional engagement with bearing member 50. If, on the other hand, bellcrank 18 tends to swing in a clockwise direction so as to advance nut 24 to the left of screw 26, the thrust on screw 26 is toward the left and ball member 54 is brought into firm frictional engagement with the friction pad 56 on the socket member 48. Since sprag clutch 58 is locked against rotation in a counterclockwise direction, the frictional engagement between ball member 54 and the pad 56 on socket member 48 prevents counterclockwise rotation of screw 26 and thus holds a bellcrank in its adjusted position.

It will be observed that the "no-back" friction developed by the thrust load always exceeds the reversibility torque generated by a definite ratio. Although the thrust load developes both friction torque and reversibility torque, the arrangement is such that an input torque is always required to move the valve even when the valve is to be moved in the direction in which it is biased by the fluid pressure.

Thus it will be seen that we have provided an operator for a bellcrank actuated mechanism which is of relatively simple and economical construction. By incorporating the "no-back" feature in the self-aligning thrust bearing the arrangement is made more compact and less expensive than would otherwise be possible.

We claim:

1. An operator for a mechanism which is actuated in opposite directions by swinging a bellcrank in opposite directions comprising a ball nut on the free end of the bellcrank, a ball screw engaged with said nut and rotatable in opposite directions to swing the bellcrank in opposite directions, means forming a ball joint supporting one end of the screw for pivotal movement to accommodate for swinging of the free end of the bellcrank, said ball joint comprising a ball member on said end of the screw and socket means rotatably supporting the ball member, said socket means comprising a pair of opposed thrust bearings arranged to receive the opposite thrust loads on said screw, a pair of opposed one-way clutches associated one with each of said bearings and a friction element interposed between each thrust bearing and opposed surface portions of said ball member and means connected with said ball member for rotating the screw about its longitudinal axis, said clutches being arranged such that when the thrust of the nut tends to rotate the screw in either direction, the thrust bearing which receives the thrust load is locked against rotation by its respective clutch and the friction element associated with said last mentioned bearing prevents the thrust load from rotating the screw in that direction.

2. The combination called for in claim 1 wherein said frictional elements are interposed between said ball member and said bearing members so that the frictional effect of each frictional member varies generally in accordance with the thrust load received by its associated thrust bearing.

3. The combination called for in claim 1 wherein said means for rotating said screw includes a shaft having a universal connection with said ball member.

4. The combination called for in claim 1 wherein said nut is swivelled to the free end of the bellcrank.

5. An operator for a butterfly valve which is actuated by swinging a bellcrank in opposite directions comprising a ball nut mounted on the free end of the bellcrank, a ball screw engaged with said nut and rotatable in opposite directions to swing the bellcrank in opposite directions, a ball joint supporting said end of the screw for pivotal movement to accommodate for swinging of the free end of the bellcrank, said ball joint comprising a ball member on said end of the screw and socket means rotatably supporting said ball member, said socket means comprising a pair of opposed thrust bearings rotatably supporting said ball member for universal pivoting movement and arranged to receive the opposite axial thrust loads on the screw, a pair of opposed one-way clutches connected one with each of said thrust bearings, a friction element for resisting rotation of the screw when the thrust load is in one direction, a second friction element for resisting rotation of the screw when the thrust load is in the opposite direction and means connected with said ball member for rotating said screw, said clutches being arranged such that when the thrust load on the nut tends to rotate the screw in either direction, the thrust bearing which receives the thrust load is locked against rotation by its respective clutch and rotation of the screw by the thrust load is restrained by one of said friction elements.

6. The combination called for in claim 5 wherein each of said thrust bearings are fashioned with arcuate surfaces which cooperate to form a spherical socket for said ball member and said friction elements are interposed between said arcuate surfaces and the spherical surface of said ball member.

7. The combination called for in claim 6 wherein said thrust bearings are of annular shape, the screw extending axially through one of said bearings where it connects with the ball member and said means for rotating the screw extending axially through the other thrust bearing where it connects with the ball member.

8. The combination called for in claim 7 wherein said means for rotating the screw comprises a shaft and a universal joint within the ball member connected with one end of said shaft.

9. The combination called for in claim 5 including means on the screw and the nut for limiting the travel of the nut on the screw axially in one direction to a predetermined position and means for adjusting said ball joint as a unit in a direction axially of the screw whereby to permit adjustment of the bellcrank at one extremity of its swinging movement.

10. The combination called for in claim 9 wherein said last mentioned means comprises a support which is relatively fixed in relation to the pivotal axis of the bellcrank and means mounting said bearings and mounted on said support for threaded adjustment in a direction axially of the screw.

11. An operator for a butterfly valve which is actuated within a valve housing by swinging of a bellcrank on the housing in opposite directions comprising a ball nut on the free end of the bellcrank, a ball screw engaged with said nut and rotatable in opposite directions to swing the bellcrank in opposite directions, a bearing retainer into which one end of the screw extends, a support fixed relative to the housing and supporting said bearing retainer for adjustment in a direction generally axially of said screw, said screw having a ball member at the end thereof within said bearing retainer, a pair of opposed thrust bearings within said retainer arranged to receive the opposite axial thrust loads on said screw, a pair of one-way clutches connected one with each of said thrust bearings, a friction element for preventing thrust-induced rotation of the screw when the thrust load is in one direction, a second friction element for preventing thrust-induced rotation of the screw when the thrust load is in the opposite direction said friction elements permitting rotation of the screw in either direction when a torque in excess of the difference between the reversibility and friction torques is applied to the screw, and means connected with said ball member for rotating said screw, said clutches being arranged such that when the thrust load on the nut tends to rotate the screw in either direction, the thrust bearing which receives the thrust load is locked against rotation by its respective clutch.

12. The combination called for in claim 11 including means on said nut and screw for limiting the extent of travel of the nut on the screw in one direction axially of the screw.

13. The combination called for in claim 12 wherein said bearing retainer comprises an annular sleeve threaded on said support for adjustment in a direction axially of the screw.

14. The combination called for in claim 13 including means for locking said retainer in adjusted position on said support.

References Cited in the file of this patent

UNITED STATES PATENTS

| | | |
|---|---|---|
| 1,023,995 | Cole | Apr. 23, 1912 |
| 2,462,574 | Wallace | Feb. 22, 1949 |
| 2,573,648 | Nickerson | Oct. 30, 1951 |
| 2,704,947 | Hopkins | Mar. 29, 1955 |
| 2,745,360 | Lunde | May 15, 1956 |
| 2,780,019 | Ferris | June 12, 1956 |